United States Patent [19]
Talati et al.

[11] Patent Number: 6,006,277
[45] Date of Patent: *Dec. 21, 1999

[54] VIRTUAL SOFTWARE MACHINE FOR ENABLING CICS APPLICATION SOFTWARE TO RUN ON UNIX BASED COMPUTER SYSTEMS

[75] Inventors: Kiritkumar Talati, Sunnyvale; C. Willard Lackie, Garland, both of Tex.

[73] Assignee: BEA Systems, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/599,514

[22] Filed: Jan. 26, 1996

Related U.S. Application Data

[63] Continuation of application No. 08/389,973, Feb. 13, 1995, abandoned, which is a continuation of application No. 07/794,735, Nov. 18, 1991, abandoned, which is a continuation of application No. 07/591,463, Oct. 1, 1990, Pat. No. 5,067,072, which is a continuation of application No. 07/391,691, Aug. 10, 1989, Pat. No. 4,961,133, which is a continuation of application No. 07/118,307, Nov. 6, 1987, abandoned.

[51] Int. Cl.[6] .................................................. G06F 9/00
[52] U.S. Cl. ...................................... 709/300; 395/500.48
[58] Field of Search ........................ 395/500.48; 209/300

[56] References Cited

U.S. PATENT DOCUMENTS

| | | | |
|---|---|---|---|
| 4,205,371 | 5/1980 | Feather | 364/200 |
| 4,525,780 | 6/1985 | Bratt et al. | 364/200 |
| 4,714,995 | 12/1987 | Materna et al. | 364/200 |
| 4,727,480 | 2/1988 | Albright et al. | 364/200 |
| 4,792,895 | 12/1988 | Tallman | 364/200 |
| 4,827,404 | 5/1989 | Barstow et al. | 395/500 |
| 4,875,186 | 10/1989 | Blume, Jr. | 364/900 |
| 4,961,133 | 10/1990 | Talati et al. | 395/650 |
| 5,067,072 | 11/1991 | Talati et al. | 395/650 |
| 5,261,090 | 11/1993 | Khoyi et al. | 395/500 |

OTHER PUBLICATIONS

Ralph Emmett, *IBM Ponders Unix*, Datamation, p. 80–88.

Kirit Talati, *The OLTP Bridge*, Software Magazine, Mar. 1990.

Kirit Talati, *Distributed On–line Transaction Processing Systems on Unix*, Unix Transaction Processing Workshop Proceedings, May 1, 1989.

David Notkin, Norman Hutchinson Jan Sanislo, and Michael Schwartz, *Heterogeneous Computing EnvironmentS: Report on the ACM SIGOPS Workshop on Accommodating Heterogeneity*, Communications of the ACM, Feb. 1987, 132, 140.

(List continued on next page.)

*Primary Examiner*—William M. Treat
*Attorney, Agent, or Firm*—Fliesler, Dubb, Meyer & Lovejoy LLP

[57] ABSTRACT

The present invention relates to a virtual software machine for providing a virtual execution environment in a target computer for an application software program having one or more execution dependencies that are incompatible with a software execution environment on the target computer. The machine comprises a plurality of independent processes, and a virtual control mechanism having a virtual management interface (VMI) for generating requests for execution to the plurality of independent processes and receiving results of such processing. The requests for execution and the results are communicated via a message exchange mechanism. The machine also includes a pre-processor for generating a pre-processed application program in which the execution dependencies are masked. A compiler/linker receives the pre-processed application program and the virtual control mechanism and generates executable code for the operating system of the target computer. A run-time module of the machine is run by the operating system of the target computer for executing the application software program in the target computer despite the execution dependency that is incompatible with the target computer system software execution environment.

9 Claims, 3 Drawing Sheets

OTHER PUBLICATIONS

J. Shirley Henry, *Cause for Concern*, Unix Rev., Sep. 1987, at 47, 55.

Robert Scheifler and Jim Gettys, *The X Window System*, 5:2 ACM Transactions on Graphics, Apr. 1986, 79, 109.

Partial European Search Report, European Patent Office, Application Number:EP 88 31 0467, Dec. 11, 1991.

Alfred V. Aho, Ravi Sethi, and Jeffrey Ullman, *Compilers: Principles, Techniques, and Tools*, Mar. 1986, pp. 16, 19, 725, and 726.

James Groff and Paul Weinberg, *Bridge Software Transports Applications to UNIX-Based Supermicros*, Mini-Micro Systems, Oct. 1983, 305, 308.

Stephen Kaazler, *Users Wonder If '286 Operating System Fits the Bill*, PC Week, p. 5.

Information Builders, Inc. information guide, *Focus. Substantiated Data*, unknown author & source.

*Customer Information Control System—An Evolving System Facility*, B. M. Yelavich,24 IBM Systems J., pp. 264–278, 1985.

A. Conrad and P. Taylor, *Customer Information Control System/Conversational Monitor System(CICS/CMS)*, Technical Bulletin, May 1986.

Techvantage, *Probe of CICS Users*, Jun. 1987.

Letter from Jack B. Hoffman to Mike Scroggie dated May 12, 1986, with attached brochure, *Pro–2, the CICS Application Generator*.

IBM, Product Announcement, *Models 919 and 939 of the AT/370–5170*, Apr. 2, 1986.

IBM, Product Announcement, *IBM VM/PC Version 2.01*, Nov. 4, 1986.

IBM, Product Annoucement, *IBM TSOSERV*, May 15, 1984.

IBM, Product Announcement, *IBM VM/PC Version 2.0*, Nov. 5, 1985.

IBM, Product Announcement, *IBM VM/PC Host Server*, Nov. 5, 1985.

4 charts from the *IBM PC–XT/370 Planning and Installation*.

2 charts from non–contiguous pages of a unnamed source for IBM's PC–XT/370.

*PC–XT Product Overview*.

Letter to Mike Scroggie from D. G. Serfass of IBM regarding IBM's PC–XT/370.

2 Pamphlets advertising the PC–XT/370.

Robert A. Moskowitz. *Stepping Up CICS Operations*, Computer Decisions, Sep. 9, pp. 36, 38, 42, and 89, 1986.

Bill Machrone, *The Mainframe Marketplace: XT/370 and 3270 PC*, PC Magazine, Jan. 24, pp. 146, 154, 1984.

*Off–Loading Mainframe Program Development to Micros Gains Momentum*, unknown author & source.

Paul Korzeniowski, *Price, Software, Delivery Delays Hamper IBM XT/370 Acceptance*, Computerworld, Oct. 22, pp. 1, 4, 1984.

Eric Bender, *AT/370 unveiled, enhancements to XT/370, 3270–PC*, Computerworld, Oct. 29, pp. 1 and 6, 1984.

Sam Whitmore, *XT/370 Promise Seen Unrealized as Market Now Prepares for the AT/370*, PC Week, pp. 3.

Sam Whitmore, *IBM Extends Office Systems, Strengthens DP*, PC Week, Oct. 30, pp. 1, 6, 1984.

Joe McLean, *New IBM PC Workstations Target Professional Users*, Electronic News, Oct. 24, 1983.

PC World, article about IBM's PC–XT/370.

Wendy Rauch–Hindin, *IBM's VM/CMS Operating System Moves to Micros*, Systems & Software, Dec., pp. 47–51, 1983.

Susan Chace, *IBM Unveils 2 More Personal Computers, Deals Blow to Office–Market Competition*, Wall Street Journal, Oct. 19, 1983.

*PCs as Programmer Work Stations*, Software Maintenance News, Nov., p. 24, 1986.

Microfocus Product Announcement, *Microfocus Announces PC–CICS for the IBM PC*, Sep. 8, pp. 1–11, 1986.

Microfocus Press Release, *Microfocus Annouces PC–CICS for the IBM PC*, Sep. 8, 1986.

Jeffry Beeler, *CICS Development and Code Testing Moves to Micros*, pp. 1 and 4.

Eric Bank, *Workbench: A Program That Means Business*, PC Magazine, Oct. 15, pp. 205–213, 1985.

Stephanie Stallings and Eric Bank, *COBOL: This Language is . . .* , PC Magazine Oct. 29, pp. 125–131, 1985.

Microfocus Press Release, *Competitve Evaluation Leads to $225,000 Order for VS COBOL Workbench*.

Microfocus Press Release, *Programmer Productivity Search Leads to Micro Focus COBOL*.

Microfocus Press Release, *ITT Hartford is Major Customer for VS COBOL Workbench*, Apr. 26, 1986.

Microfocus pamphlet, *VS COBOL Workbench in Depth*.

*Micro Focus Development Software Allows Mainframe Programming on the PC*, PC Week.

*What's New*, Byte, May 1985.

Microfocus Magazine, *Compact Level II COBOL*, 1983.

Microfocus Magazine is High Performance Level II COBOL, 1983.

*RealCICS User Manual*, Beta Draft, Jul. 3, 1986.

Newsletter by Realia (maker of RealCICS), several articles, one on RealCICS, May 1986.

Realia article, *Realia COBOL Product Description*, Sep. 11, 1985.

Norcom, *Screenio Version 2.0 Product Announcement*.

Realia, *Product Demonstration Announcement*, Oct. 6, 1986.

Realia Inc. news release, *Realia Expands International Distribution*, Oct. 1, 1986.

Realia Inc. news release, *Realia Offers Screen Management Package*, Sep. 30, 1986.

Realia Inc. news release, *Realia's Marc Sokol Addresses International DP Conference*, Sep. 16, 1986.

Realia Inc. news release, *Porting Mainframe Applications to PCs*, Jul. 31, 1986.

Realia Inc. news release, *Realia Introduces RealFILE™Multi–User Operating Environment*, Jun. 16, 1986.

Realia Inc. announcement, *Realia at INFO 86*.

Realia Inc. announcement, *Realia Distributors*.

Realia Inc. announcement, *Realia History*.

Realia Inc., *Realia Products*.

Realia pamphlet, *RealCICS Development System*.

Eddy Goldberg, *CICS PC tool nears completion*, Computerworld, Sep. 22, 1986.

Product Summary for Real CICS.

S.J., *Package Allows Users to Bring Mainframe CICS Applications Down to PC*.

Realia Inc., *Realia COBOL Order Form*.

Realia Inc., *Maintenance and License Agreement Realia, Inc. Product: Realia COBOL*.

Paul Gillin, *COBOL Compiler for Micros Earns Kudos from User*, Computerworld, Nov. 5, p. 7, 1984.

Ampersand Software Applications pamphlet, *Matrix System Overview*.
Ampersand Software Applications presentation, *Matrix System Overview*.
Triangle Software Company program specifications, *CICS/pc Desktop Development*.
Article with unknown author about CIC/pc software.
Advertisement for CIC/pc, Computerworld, Jan. 12, p. 61, 1987.
Triangle Software Company program specifications, *CICS/pc*.
Triangle Software Company pamphlet, *CICS/pc: The Program for Programmers Who Hate to Wait*.
*Pkg. Replicates CICS to IBM PC*, Management Information, Oct. 6, 1986.
Letter dated Oct. 30, 1986 about CICS/pc seminar.
Advertisement for CICS/pc.
Triangle Software Company, *Introductory Price Schedule*, Sep. 1, 1986.
Matterhorn, Inc. product overview, *PC/HIBOL Release 2.0*, Jul. 1987.
Clark Information Technologies Corporation product overview, *URUS Installation Examples*.
Planning Research Company brochure, *The Art of Communicating in a Straightforward Manner*.
Planning Research Company pamphlet, *The Central Software Story*.
Ryan–McFarland Corporation pamphlet, *RM/COBOL*.
Ryan McFarland Corporation product summary, *RM/COS Commerical Operating System*.
Glenn Embrey, *COBOL Compiler Fits Micros and Mainframes*, Electronics, Aug. 11, pp. 118–119, 1983.
On–Line Software International brochure, *InterTest*.
Letter from On–Line Software International regarding products.
On–Line Software International brochure, *Micro–to–Mainframe Links*.
On–Line Software International brochure, *Introduction to the Freestyle Family*.
Datapro report, *OmniLink Electronic Mail –On–Line Software International*, Oct. 1984.
*Found: The Link Between Personal Computers and Corporate Data Bases*, Business Week, Jul. 23, 1984.
Marsha Johnston Fisher, *On–Line: System Replaces DBDS*, MISWeek, Mar. 6, 1985.
On–Line Software International, Inc. pamphlet, *Will the New Content Address Method Make the Relational Data Base Obsolete?*.
On–Line Software International, Inc. product brief, *Omnilink Electronic Mail*.
On–Line Software International, Inc. product brief, *Omnilink Micro/Mainframe Link*.
On–Line Software International, Inc. product brief, *Omnilink Document Exchange*.
On–Line Software International manual, *IntelaGen—The Programmer's Source Code Generator*, Jan. 1987.
Multi Solutions, Inc. technical manual, *S1 —The Only Truly Authentic Microcomputer Operating System*, 1984.
Multi Solutions, Inc. brochure, *Super–Link*.
Product Summaries, *S1 and Super–Link*.
Multi Solutions, Inc. pamphlet, *The S1 Operating System*.
Paul Gillin, *Multi Soft Unveils Micro–Mainframe Link Software*, PC Week, Nov. 12, p. 1, 1985.
Steve Polilli, *Multi Soft Shows 'Super Link'*, MISWeek, Sep. 18, p. 61, 1985.
Patricia Zengerle, *Micros Seen Doing Processing Tasks to Relieve Mainframes*, MISWeek, Apr. 14.
Multi Soft, Inc. overview, *Super–Link*.
Multi Soft, Inc. news release, *Multi Soft, Inc. Appoints Donald Wszolek to New Position as Vice President, Marketing & Sales*, Sep. 10, 1986.
Multi Soft, Inc. news release, *Multi Solutions, Inc. Announces Licensing Agreement Between Multi Soft, Inc. and Dun & Bradstreet*, Jun. 18, 1986.
Multi Soft, Inc. brochure, *Super–Link: True Mainframe–Micro Cooperative Processing Has Arrived*.
Patricia Zengerle, *D & B, Multi Soft Enter Super–Link Contract*, MISWeek, Sep. 18, p. 61, 1985.
Multisoft, Inc. pamphlet, *CICS/S1 Questions and Responses*, Dec. 24, 1986.
Karin Rotzinger, *Multi Soft Unveils Mainframe–To–Micro Com Package*, Computer Systems News, Oct. 21, 1985.
IBM, *Systems Application Architecture—An Overview*, Apr. 27, 1987.
D.D. Chamberlin et al., *Sequel 2:A Unified Approach to Data Definition, Manipulation, and Control*, IBM J. Res. Develop., pp. 560–575, Nov. 1985.
Gartner Group reseach note, *DB2 Release —Preliminary Analysis*, Software Management Strategies, Feb. 12, 1986.
IBM product announcement, *IBM Database 2 (DB2) Version 2*, Apr. 19, 1988.
Letter from Henry Bing, Jr.(IBM) to Unicorn Systems, Sep. 12, 1986.
Unicorn Systems Company product description, *Micro-CICS*, Nov. 5, 1984.
Unicorn Systems Company news release *Unicorn Systems Begins Delivery of MicroCICS—CICS Productivity Software for the IBM PC/370*, Jan. 2, 1985.
Brandy C. De Shazo, *Personal CICS*, Tech. Journal, Dec. 1985.
AT&T draft contract, *Sub–Licensing and Consulting Agreement*, Jan. 23, 1985.
Unicorn Systems Company news release, *Unicorn Systems Company Introduces VMCICS, First VM–Based CICS Run–Time Environment for Canaan and IBM Departmental Computers*.
Unicorn Systems Company news release, *Unicorn Systems Company Introduces First CICS Development and Execution Systems for IBM's Entire Line of VM–Based Computers*.
Unicorn System Company product overview, *VMCICS/Execution System (VMCICS/ES)*.
Unicorn Systems Company, Corporate Profile, Jun. 1989.
A. T. Twigger of Root Computers Limited, *Porting a CICS Application to UNIX*, Jun. 1985.
Unisoft Corporation product summary, *UniTECS*, May 1987.
Theresa Conlon, *UniSoft Has CICS Emulator*, MISWeek, Oct. 12, p. 36, 1987.
Suzanne Weixel, *Unix gets CICS link*, ComputerWorld, Oct. 26, 1987.
UniSoft Corporation, *Introduction to UniTECS*.
Unisoft Corporation brochure, *UniTECS™*, 1987.
Andrew Twigger, *Establishing an Alternative Strategy*, IX Magazine, Jul.
*Conversion May Be Way Forward*, IX Magazine, Mar. 1986, at 20,21.
Root Business Systems, *UniTECS—Product Description*, 1986.

VIRTUAL SOFTWARE MACHINE FOR ENABLING CICS APPLICATION SOFTWARE TO RUN ON UNIX BASED COMPUTER SYSTEMS

CROSS REFERENCE TO RELATED APPLICATIONS

This application is a continuation of application Ser. No. 08/389,973, filed Feb. 13, 1995, now abandoned, which is a continuation of prior application Ser. No. 07/794,735 filed Nov. 18, 1991 now abandoned, entitled "Virtual Software Machine for Enabling CICS Application Software to Run on Unix Based Computer Systems" by Kiritkumar Talati and C. Willard Lackie now abandoned, which is a continuation of prior application Ser. No. 07/591,463, filed on Oct. 1, 1990, now U.S. Pat. No. 5,067,072, which was a continuation of application Ser. No. 07/391,691, filed on Aug. 10, 1989, now U.S. Pat. No. 4,961,133, which was a continuation of prior application Ser. No. 07/118,307, filed Nov. 6, 1987, now abandoned.

TECHNICAL FIELD

The present invention relates generally to computer systems and more particularly to a virtual interface architecture for porting application software, normally compatible with a "source" computer, to a heterogenous or "target" computer.

BACKGROUND OF THE INVENTION

Computer systems having homogeneous hardware can interact and share data over a network. For example, a "local area network" can connect two or more computers located in physical proximity to enable users to access a shared database. Moreover, it has also been possible in the prior art to exchange software between identical types of machines. To the contrary, most interactions between heterogenous machines still involve little more than simple transfers of data files or the like. Software applications written for one type of hardware or for one specific type of operating environment, however, cannot be ported or "transferred" to a system having different physical characteristics without being entirely rewritten. Therefore, while much progress has been made in developing techniques for exchanging data between incompatible machines, it has not been possible to exchange software between heterogenous computer systems.

There have been a number of solutions proposed to overcome the "compatibility" problems associated with the enormous array of prior art computer systems having diverse and incompatible hardware and/or software. One solution is the use of a single operating system along a continuum of hardware products from microcomputer to mainframe. Although this approach is a satisfactory solution with respect to the products of an individual manufacturer, it does not allow the transfer of software applications across incompatible hardware and operating system environments. Another alternative would be the creation of a common communication environment across distributed systems through use of a standard industry-wide protocol. While some efforts have been made to generate standards for such a protocol, this solution presents complex technological problems.

There therefore exists a need for an interface system which provides application program portability and consistency across diverse computer environments.

BRIEF SUMMARY OF THE INVENTION

It is an object of the present invention to provide an architecture for porting application software, normally compatible with a "source" computer, to a heterogenous or "target" computer.

It is still another object to create a "virtual" interface architecture which enables heterogenous machines to mask the differences in their hardware and software by isolating the application software from the processing environment.

It is another object of the invention to provide application program portability and consistency across a number of different office automation, transaction processing and non-procedural language-based system architectures.

It is yet a further object of the present invention to enable an existing application program to function as a direct link to the hardware and operating system of a diverse computer system without a transaction processing system.

It is another object of the present invention to provide a method and apparatus which facilitates the functional interconnection of programs written in procedural programming languages (such as "C", "COBOL" or "ADA"), or the interconnection of a program written in a procedural programming language with a program written in a non-procedural programming language (such as "LISP" or "PROLOG").

It is a further object of the present invention to allow the development of application programs on micro or minicomputers for migration to mainframe computers and vice versa. As a byproduct, the present invention allows existing mainframe transaction processing system applications to run on micro or mini-computers without modifications or programming changes.

It is still another object to provide a virtual interface system which will enable the migration of existing applications to new and more advanced hardware environments created in the future.

According to the preferred embodiment of the invention, a virtual interface system for porting application software to a heterogenous or "target" computer comprises a plurality of independent interface processes for running in one or more distributed processors of the target computer. One or more of the processes are used to carry out at least one task required by the application software. The system also includes a pre-processor and compiler for processing program code of the application software into object code compatible with the target computer. According to the preferred embodiment, the program code of the application software is pre-processed by identifying functional calls therein, converting the functional calls in the program code to functional calls in the language native to the target computer, and compiling the functional calls of the language native to the target computer to create the object code. The pre-processor is implemented in either the source computer or the target computer.

The object code corresponding to the pre-processed program code is then linked with control codes of the virtual interface system to generate code fully executable by the operating system of the target computer. The system control codes include a plurality of so-called process management interface modules for communicating with the plurality of processes via a partitioned storage area, and a virtual management interface for controlling the plurality of process management interface modules. The virtual management interface and the process management interface modules are compiled into object code before linkage with the object code corresponding to the pre-processed program code.

According to a feature of the invention, the virtual interface system further includes a blackboard switch logic for generating the partitioned storage area and for interfacing the plurality of processes to the process management interface modules via the partitioned storage area. All communications to and from the processes go through the blackboard switch logic to the partitioned storage area and vice versa.

In a run-time mode, the executable code (comprising the linked pre-processed program code the virtual management interface and the process management interface modules) is run using the operating system of the target computer. This operation enables the process management interface modules to control the processes via the blackboard switch logic and the partitioned storage area and thereby enable the processes to carry out the task required by the application software.

In accordance with another feature of the invention, the target computer includes a plurality of partitioned storage areas, each generated and controlled by its own blackboard switch logic. Each of the partitioned storage areas may also include its own plurality of independent processes. In this architecture, processes associated with one partitioned storage area communicate with processes associated with another partitioned storage area via the blackboard switches. In addition to routing data and control information between the process management interface modules and the processes via the partitioned storage areas, each blackboard's switch logic includes security and encryption/decryption algorithms to prevent or limit access to the one or more storage areas.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
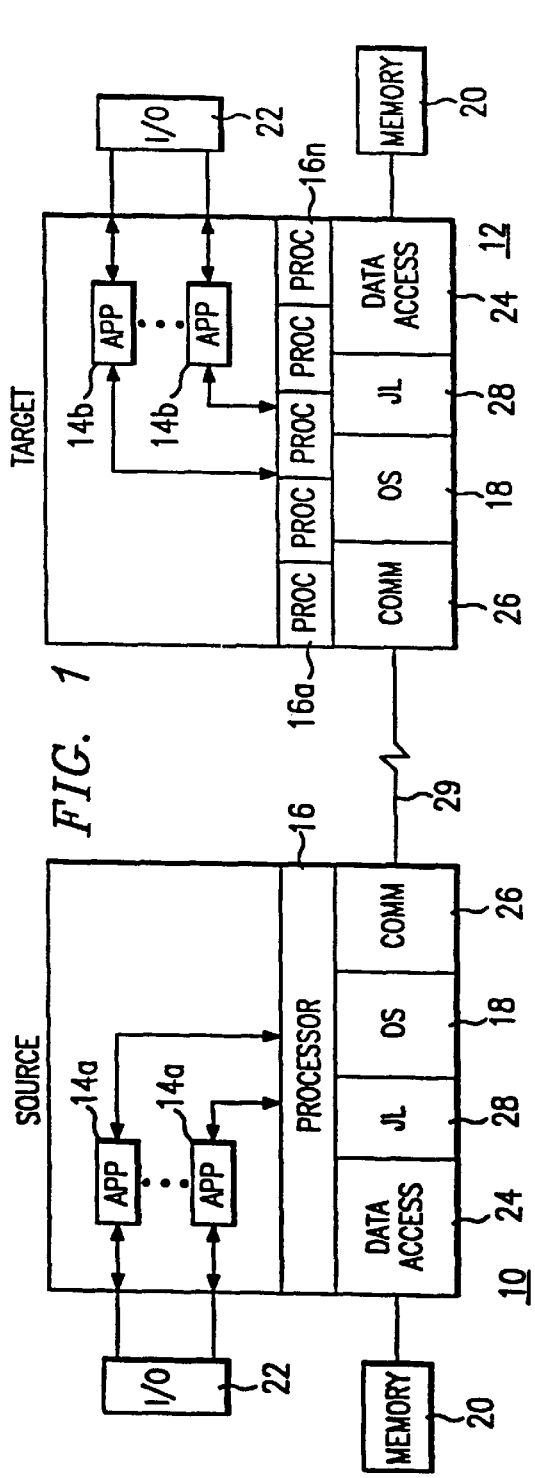
FIG. 1 is a block diagram of a source computer and a heterogenous or "target" computer.

With reference now to the drawings wherein like reference characters designate like or similar parts throughout the several figures, FIG. 1 is a simplified block diagram of a "source" computer 10 and a heterogenous or "target" computer 12. As used herein, "heterogenous" refers to the fact that application program(s) 14a written for the source computer 10 cannot be run on the target computer 12 because computers 10 and 12 are incompatible at the hardware and/or software level. For example, and not by way of limitation, application programs 14a of the source computer 10 may comprise a set of procedural based programs written in "C", "COBOL" or "ADA", whereas application programs 14b of the target computer 12 may comprise a set of knowledge-based programs written in "LISP". Or, source computer 10 may comprise a transaction processing system such as IBM's CICS (customer information control system) whereas the target computer 12 may include non-IBM hardware for running an expert system or the like. In both cases, application programs 14a or 14b are not capable of being transferred or "ported" to the incompatible computer 12 or 10, respectively.

Each of the computers 10 and 12 includes one or more integrated or distributed processors 16a–16n capable of receiving and manipulating data and generating outputs, operating system software 18 which controls the operation of the overall computer system, memory (e.g., a disc drive and a suitable disk storage) 20 for storing data and application programs, input/output devices (e.g., keyboards, printers, CRT's, etc.) 22 for enabling a user to interact with the system, database management system 24 for controlling access to and storage of data, communications system 26 for controlling communications to and from the computer system via network 29 for example, and journal system 28 for storing and retrieving data from a journal. Such elements are, of course, conventional in the prior art. As will be described below, the virtual interface architecture of the present invention provides the capability to port application programs 14a (normally compatible with the source computer 10) to the target computer 12 and vice-versa, without modifications or programming changes to such programs. As used herein, "virtual" is the opposite of "transparent" in the sense that something "transparent" appears to the user not to exist but in fact does, while something "virtual" appears to the user to exist but does not.

Figure 2:
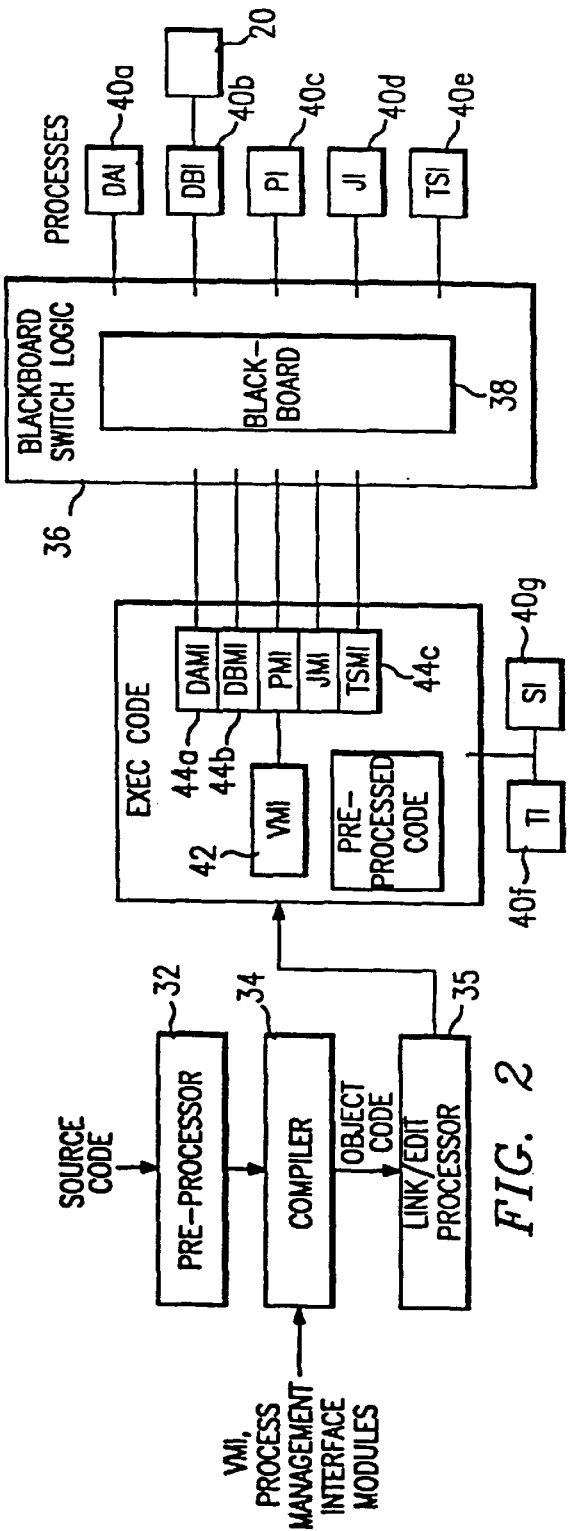
FIG. 2 is a simplified block diagram of a virtual interface system of the present invention for providing application program portability and consistency across the source and target computers of FIG. 1.

The objects of the invention are achieved by the novel virtual interface system 30 as shown in the simplified block diagram of FIG. 2. As discussed above, virtual interface system 30 enables the application programs 14a to be executed without regard to whether such programs are compatible with the processor(s) 16, operating system 18, storage devices 20, input/output devices 22, data access system 24, communications system 26 or journal system 28 of the target computer system 12. The present invention therefore provides complete application program independence from the hardware, operating system, language, database management system and network characteristics of a heterogenous computer system. In this way, the virtual interface system enables software applications to be environment-independent by masking differences in the physical and functional characteristics of the source and target computers.

Virtual interface system 30 comprises a number of functional elements: a pre-processor 32, a compiler 34 for generating object code compatible with (but not executable by) the operating system of the target computer 12, a link/edit processor 35 for linking various object code programs to create fully-resolved core image code ("EXEC CODE") executable by the operating system of the target computer, a blackboard switch logic 36, a partitioned storage area 38, and a plurality of independent processes 40a–40n for running in the one or more processors 16 of the target computer system 12. Each of the processes 40 comprises an independently schedulable unit of computation which, in conjunction with one or more other processes, carries out one or more "tasks" required by the application program. Each task therefore consists of one or more independent processes.

According to the invention, the blackboard switch logic 36 is controlled by the operating system 18 of the target computer 12 to generate the partitioned storage area 38, or "blackboard". As will be described, the blackboard switch logic 36 is the conduit for all communications to and from the processes 40a–40n and all such communications follow the same route: through the blackboard switch logic 36 to the partitioned storage area 38, or from the partitioned storage area through the blackboard switch logic. The routing of data and information through the blackboard switch logic 36 and the partitioned storage area 38 is controlled by the executable code ("EXEC CODE") output from the link/edit processor 35. As will be described, the executable code comprises linked object code programs representing (a) pre-processed program code of the application program, (b) a so-called virtual management interface ("VMI") 42, and (c) a plurality of process management interface modules 44a–44n. The object code representing the VMI 42 and the plurality of process management interface modules 44 is generated by the compiler 34.

According to the invention, the process management interface modules 44 control the processes 40 via the blackboard switch logic 36 and the partitioned storage area 38. Processes 40 and the executable code are capable of being executed in the target computer 12 but not in the source computer 10. As will be described, the blackboard switch logic 36 also includes security and encryption/decryption routines for preventing or limiting data access or retrieval from the partitioned storage area, a data compression routine for conserving available memory in the blackboard, and a routine for controlling inter-blackboard communications.

Figure 3:
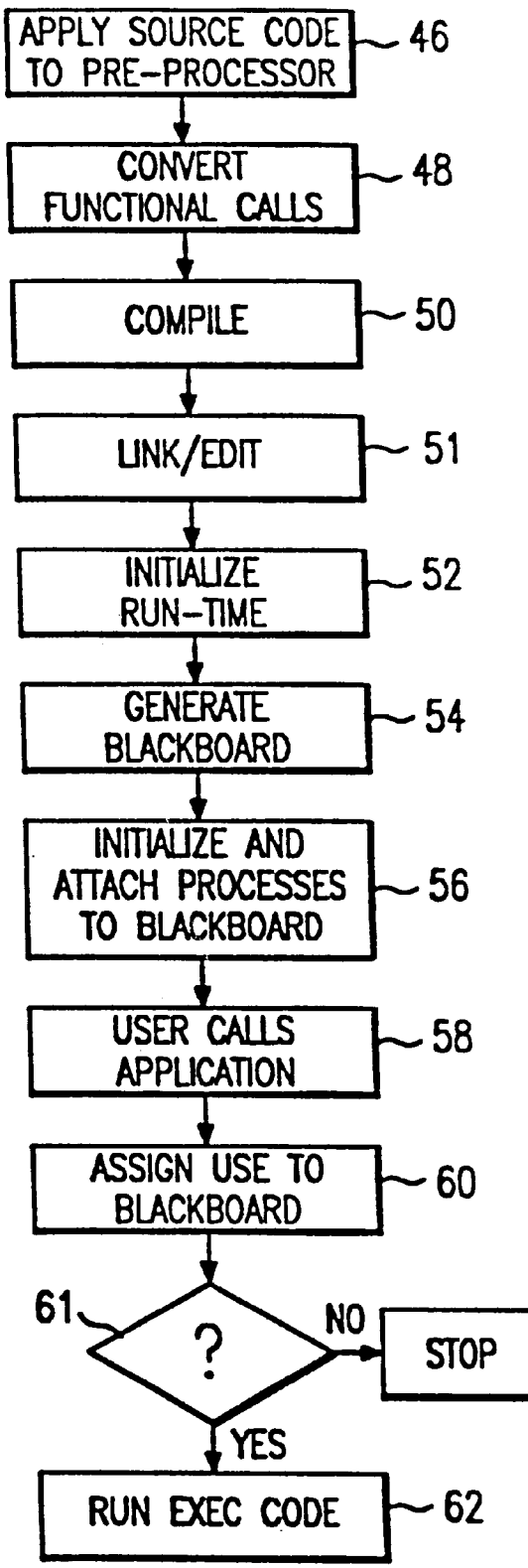
FIG. 3 is a simplified flowchart showing the basic operating steps of the virtual interface system of FIG. 2.

The operation of the virtual interface system 30 of FIG. 2 can now be described in connection with the flowchart of FIG. 3. In general, the virtual interface system enables application programs to run irrespective of the hardware environment. This is accomplished by masking the application program and operating system functional calls (written, for example, in "ADA," "C," "CICS," "COBOL," "LISP," "PROLOG," etc.) from the hardware by linking the code of the original application program to/from the hardware operating system. This masking is carried out by the pre-processor 32 and provides both the user/programmer and the hardware with what each expects to see even though they are communicating in two different languages.

In particular, the source code of an application 14a is applied to the pre-processor 32 of the virtual interface system 30 at step 46. Pre-processor 32 identifies the functional calls (i.e., tasks) in the program code and, at step 48, converts these functional calls to functional calls of the language native to the target computer (i.e., to the compiler 34). For example, if the application program 14a is a CICS application and the target computer is "C"-based, pre-processor 32 serves to format the CICS functional calls in the source code to "C" calls. The output of the pre-processor 32 is then supplied to the compiler 34 which, at step 50, compiles the "C" code into object code compatible with but not fully executable by the operating system 18 of the target computer 12. Although not shown in detail in FIG. 3, the pre-processor 32 also masks the hardware operating system functional calls to the original application program. Steps 46–50 represent a "development" mode of operation and may be carried out at any time in either the source or target computer.

At step 51, the object code corresponding to the pre-processed program code 32 is linked to the (previously generated) object codes of the VMI 42 and the process management interface modules 44. This linkage is carried out by the link/edit processor 35 in a conventional fashion known in the art. The resulting "EXEC CODE" comprises a plurality of calls to the virtual management interface 42 (and thus the process management interface modules) for carrying out the tasks required by the application program. At step 52, the "run-time" mode of operation is initialized. This causes the blackboard switch logic 36, at step 54, to generate the partitioned storage area 38 in memory of the target computer 12. The blackboard switch logic 36 also functions, at step 56, to initialize the processes 40 and "attach" the processes to the partitioned storage area 38. As used herein, the "attaching" of processes refers to the assignment of a designated discrete portion of the partitioned storage area 38 for each process 40. Communications to and from each such process must therefore be addressed to the discrete portion of the partitioned storage area 38 designated by the blackboard switch logic 36 at step 56. In this manner, the blackboard switch logic 36 uses so-called "reserved spot" communication for data access to and from the partitioned storage area 38.

At step 58, a user of the target computer system 12 calls the software application for execution. This application, normally incompatible with the target computer 12, has been pre-processed, compiled and linked with the VMI and interface modules to generate executable code as previously described. At step 60, the blackboard switch logic 36 assigns the user to the partitioned storage area 38. A test 61 is then run to determine if use is authorized. This test uses the security routines of the blackboard switch logic 36. If use is authorized, processing begins. In particular, the executable code (and thus the virtual management interface 42) is run by the operating system 18 of the target computer 12 at step 62 to call one or more of the process management interface modules 44a–44n as required by the application software task(s). Each of the process management interface modules then communicates with the one or more processes 40a–40n via the blackboard switch logic 36 and blackboard 38 to perform the task.

It can be seen therefore that the interface system 30 uses a "virtual" architecture to perform program "tasks" using a plurality of machine-independent "interface" processes 40 which are interfaced to a plurality of process management interface modules via a switch logic-generated partitioned storage area. The process management interface modules 44 do not perform the tasks themselves, rather, they serve only to interface to those processes which actually do perform the tasks. This separation of the processes 40 from the process management interface modules 44 via the blackboard switch logic and blackboard advantageously enables the system 30 to provide application program portability and consistency across diverse computer environments to achieve the objects of the present invention.

Only the executable code and the interface processes 40 need be tailored to the target computer 12 environment. Moreover, the processes themselves can be located in one or more distributed processors 16a–16n of the target computer 12, thus facilitating the use of parallel processing techniques and fault tolerant processing.

Figure 5:
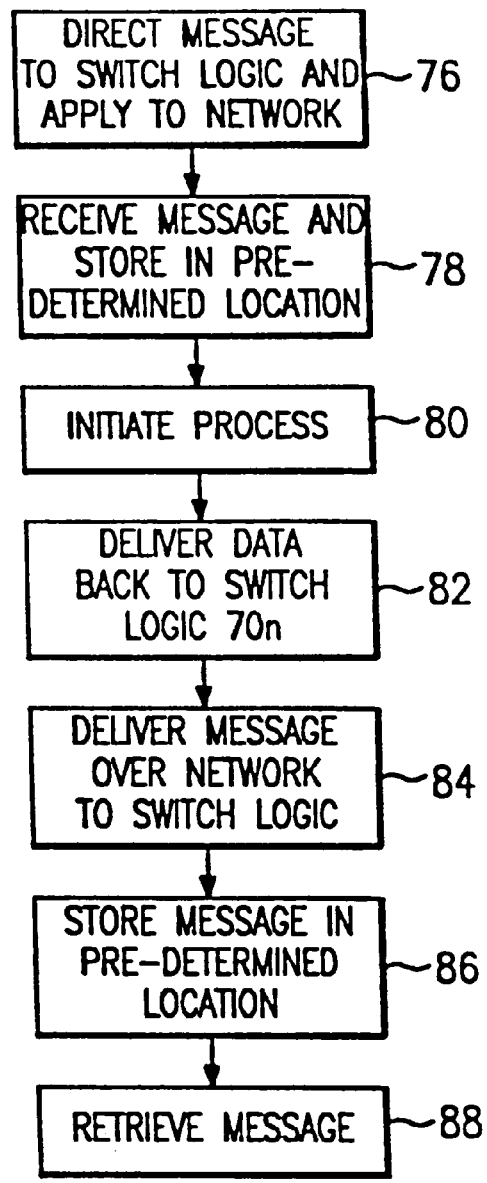
FIG. 5 is a flowchart representation describing how the virtual interface system of FIG. 4 effects retrieval of data from a remote database of the target computer.
Figure 4:
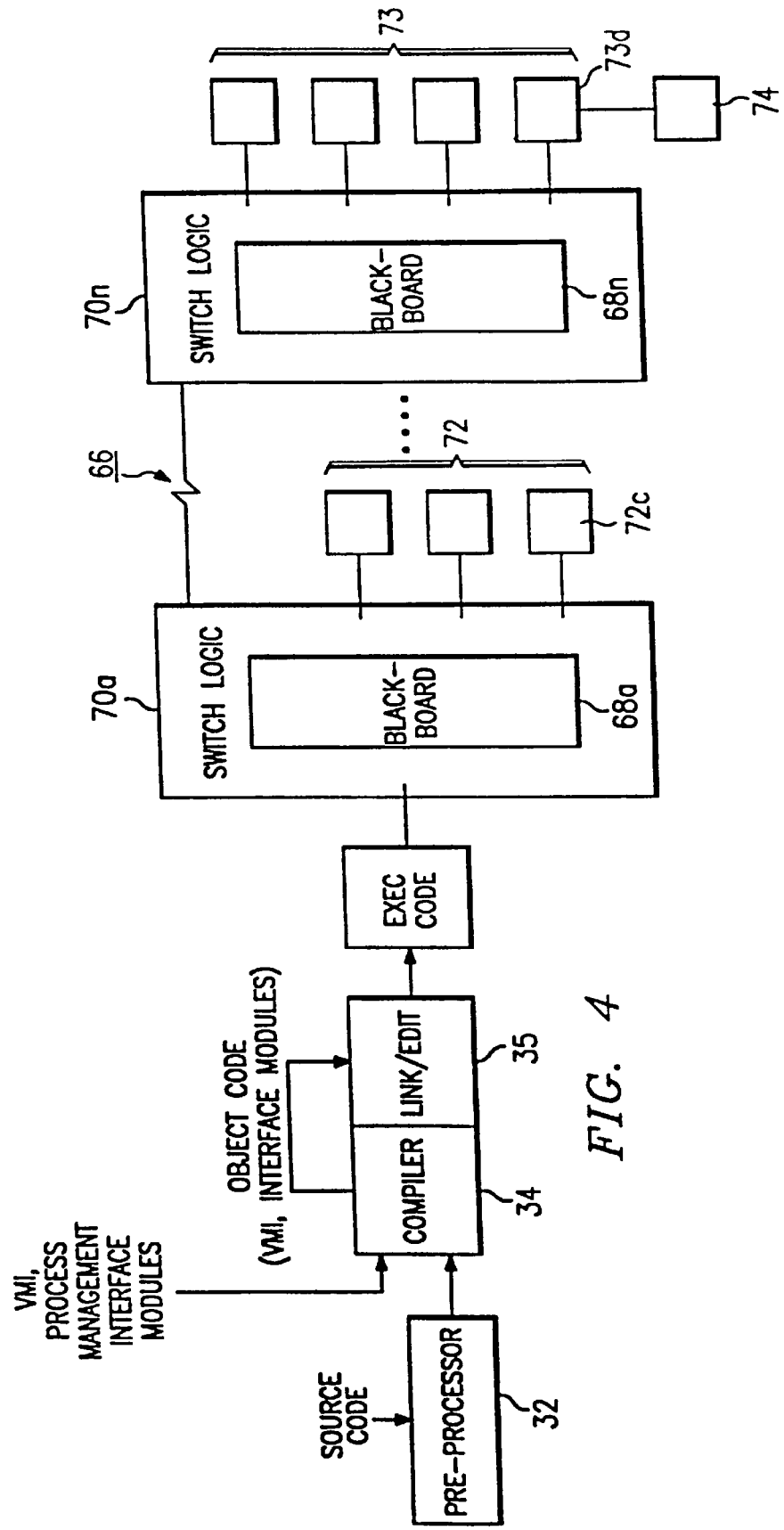
FIG. 4 is a simplified block diagram of a modified virtual interface of the invention wherein the target computer includes a distributed blackboard architecture having a plurality of partitioned storage areas.

Referring now to FIG. 4, an alternate embodiment of the virtual interface system is shown. In this embodiment, the target computer 12 includes two or more partitioned storage areas 68a–68n each generated and controlled by a corresponding blackboard switch logic 70a–70n in the manner previously described. In this architecture, each of the blackboards 68 has its own set 72 and 73 of processes and the identity of the processes in each set may differ from one blackboard to the next. Certain specified processes may thus be carried out in remote locations of the target computer via inter-switch logic communications over a network 66. According to another feature of the invention, data and control information is passed between the partitioned storage areas via the blackboard switch logic. Such communications are controlled by a blackboard-to-blackboard communications routine resident in the blackboard switch logic 36 associated with each blackboard. This operation is shown by way of example in FIG. 5.

In particular, assume that a process 73*d* is associated with the blackboard switch logic 70*n* of FIG. 4 and controls data access from a database 74. If a process 72*c*, for example, requires data from the database 74, the following steps are carried out. At step 76, process 72*c* directs a message to the blackboard switch logic 70*a* which then, through its blackboard-to-blackboard communications routine, places the message on the network 66. At step 78, the blackboard switch logic 70*n* receives the message and places it in a specific location of the blackboard 68*n* associated with the process 73*d*. Once notified of the message, process 73*d* is then carried out at step 80 to retrieve the data from the database 74. The required data is then appended to a message at step 82 and delivered, by the process 73*d*, back to the blackboard switch logic 70*n*. At step 84, the blackboard switch logic 70*n* uses its blackboard-to-blackboard communication routine to deliver the message over the network 66 back to the blackboard switch logic 70*a*. At step 86, the blackboard switch logic 70*a* places the message in the blackboard 68*a* at the location associated with the originating process 72*c*. At step 88, the message is retrieved by the process 72*c* from the blackboard 68*a*.

Referring now back to FIG. 2, the plurality of interface processes 40 preferably include at least the following:

Data Access Interface Process ("DAI") 40*a* for managing data access to and from a database management system 24 via one or more database interface processes (DBI);

Database Interface Process ("DBI) 40*b*—for storing and retrieving data from the database management system 24;

Presentation Interface Process ("PI") 40*c* for controlling data presentation on the input/output devices 22 of the target computer system;

Journal Interface Process ("JI") 40*d* for storing and retrieving data from the journal system 28 of the target computer system;

Task Storage Interface Process ("TSI") 40*e* for controlling management and storage of data across tasks;

Storage Interface Process ("SI") 40*f* for controlling data management within a task and data management between tasks; and Task Control Interface Process ("TCI") 40*g* for controlling the initiation, delay, suspension or termination of a task.

The above processes, while exemplary, are not meant to be limiting. Data access interface process ("DAI") knows the symbolic (i.e., system) location of all data and uses one or more database interface processes to physically access such data. Moreover, with the exception of the storage and task control interface processes, each of the processes 40 cooperates with a corresponding process management interface module 44 in the manner previously described. For example, data access interface process ("DAI") 40*a* is controlled by a data access process management interface ("DAMI") module 44*a* which in turn is controlled by the virtual management interface ("VMI") 42. Likewise, presentation interface process ("PI") 40*c* cooperates with the PMI module 40*c*, and so forth.

Preferably, the storage interface process 40*f* and the task control interface process 40*g* are controlled by and communicate with the virtual management interface 42 via direct message exchanges rather than a blackboard. This scheme enables the virtual management interface 42 to exhibit direct or "action-centered" control of the SI and TCI processes.

In the preferred embodiment, data and/or control information is transferred (between tasks, between process management interface modules and processes, and between distributed blackboards) using the following "send" and "receive" message formats:

```
SEND (data, length, command, bbid, iid)
RECEIVE (data, length, command, bbid, iid); where
    data     =   information
    length   =   length of data
    command  =   action required or "subclass"
    bbid     =   identification of blackboard
    iid      =   process identification or
                 "class" (blackboard address)
```

The following are representative program listings showing (a) a pre-processor for receiving a CICS application program and in response thereto generating a pre-processed program, (b) an exemplary CICS test program, (c) the CICS test program following processing by the pre-processor, (d) the journal management interface module ("JMI") prior to compiling, (f) the journal interface process ("JI") prior to compiling and (g) the blackboard switch logic. The blackboard switch logic includes four functional components: a blackboard generation and process attachment routine, a routine for attaching a user and an associated task to the blackboard (including security), the reserved-spot communication routines (for processing the "SEND" and "RECEIVE" messages) and a blackboard-to-blackboard communications routine.

Although the invention has been described and illustrated in detail, the same is by way of example only and should not be taken by way of limitation. The spirit and scope of the present invention are limited only to the terms of the appended claims.

We claim:

1. A virtual software machine having a management interface for providing a virtual execution environment in a target computer system for an application software program written to execute in a CICS execution environment and having one or more execution dependencies that are incompatible with a UNIX-based software execution environment on the target computer system, comprising:

a plurality of independent processes;

a management interface for generating requests for execution to the plurality of independent processes and for receiving results of such processing;

a message exchange mechanism comprising send and receive messages for communicating the requests for execution to the plurality of independent processes and for communicating the results of such processing back to the management interface via a plurality of message passing locations each unique to and dedicated to one of the plurality of independent processes;

pre-processing means for identifying at least one CICS execution dependency of the application software program and in response thereto generating a pre-processed application software program that isolates the identified CICS execution dependency from the application software program;

means connected to the pre-processing means for converting the pre-processed application software program and the management interface into executable code for the target computer; and run-time means run by the operating system of the target computer system for executing the application software program in the target computer system despite the CICS execution dependency that is incompatible with the target computer system UNIX-based software execution environment, wherein the run-time means comprises:

means for generating a request for execution when the CICS execution dependency is encountered as the executable code is running in the target computer system;

means connected to the generating means for evaluating the request for execution to identify which of the plurality of independent processes is required to execute the request for execution;

means connected to the evaluating means for delivering the request for execution to the identified independent process via a message to one of the plurality of message passing locations that is unique to and dedicated to the identified independent process;

means connected to the delivering means for processing the request for execution using the identified independent process to thereby execute the request; and means for returning results of the executed request back to the management interface via a message to the one of the plurality of message passing locations.

2. The virtual software machine as described in claim 1, wherein the plurality of independent processes include a database interface process for storing and retrieving data from a database management system.

3. The virtual software machine as described in claim 2, wherein the plurality of independent processes include a data access interface process for managing data to and from the database management system.

4. The virtual software machine as described in claim 1, wherein the plurality of independent processes include a presentation interface process for controlling data presentation on input/output devices of the target computer system.

5. The virtual software machine as described in claim 1, wherein the plurality of independent processes include a journal interface process.

6. The virtual software machine as described in claim 1, wherein the plurality of independent processes include a task storage interface process.

7. A virtual software machine, comprising:

a plurality of independent processes;

a management interface for generating requests for execution to the plurality of independent processes and for receiving the results of such processing;

a message exchange mechanism for communicating the requests for execution to the plurality of independent processes and for communicating the results of such processing back to the management interface, the message exchange mechanism comprising a plurality of message passing locations each unique to and dedicated to one of the plurality of independent processes;

pre-processing means for identifying at least one CICS execution dependency of an application software program and in response thereto generating a pre-processed application software program that isolates the identified CICS execution dependency from the application software program;

means for converting the pre-processed application software program and the management interface into code executable by a target computer; and means for executing the application software program in a UNIX-based software execution environment on the target computer, comprising;

means for generating a request for execution when a CICS execution dependency is encountered as the executable code is running in the target computer;

means connected to the generating means for evaluating the request for execution to identify which of the plurality of independent processes is required to execute the request for execution;

means connected to the evaluating means for delivering the request for execution to the identified independent process via one of the plurality of message passing locations in the message exchange mechanism that is unique to and dedicated to the identified independent process;

means connected to the delivering means for processing the request for execution using the identified independent process to thereby execute the request; and means for returning results of the executed request back to the management interface via the one of the plurality of identified message passing locations in the message exchange mechanism.

8. A method for providing a virtual execution environment in a target computer, comprising:

a. identifying, by a pre-processing means, at least one CICS execution dependency of an application software program and in response thereto generating a pre-processed application software program which isolates the identified CICS execution dependency from the application software program;

b. converting, by a compiler means, the pre-processed application software program and a management interface into object codes;

c. creating executable code where the management interface is substituted for the identified CICS execution dependency of the application software program;

d. generating a message exchange mechanism means employing a storage area in the target computer, the storage area comprising a plurality of messaae passing locations each unique to and dedicated to one of the plurality of independent processes;

e. generating a request for execution when the CICS execution dependency is encountered as the executable code is running in a UNIX-based software execution environment on the target computer;

f. evaluating the request for execution to identify which of the plurality of independent processes is required to execute the request for execution;

g. delivering the request for execution to the identified independent process via one of the plurality of message passing locations in the storage area that is unique to and dedicated to the identified independent process;

h. processing the request for execution using the identified independent process to thereby execute the request; and i. returning results of the executed request back to the management interface via the one of the plurality of messaae passing locations such that the application software program is executed despite the CICS execution dependency that is in compatible with the target computer's UNIX-based software execution environment.

9. The method as described in claim 8, further comprising:

assigning each independent process a unique address in the storage area prior to running the executable code in the target computer.

* * * * *